United States Patent
Anton et al.

(10) Patent No.: US 9,890,292 B2
(45) Date of Patent: Feb. 13, 2018

(54) SOL-GEL INK AND METHOD FOR PRODUCING SAME

(71) Applicant: SCHOTT AG, Mainz (DE)

(72) Inventors: Andrea Anton, Hueffelsheim (DE); Angelina Milanovska, Mainz (DE); Matthias Bockmeyer, Mainz (DE); Annelie Gabriel, Klein-Winternheim (DE); Franziska Back, Schweinfurth (DE)

(73) Assignee: SCHOTT AG, Mainz (DE)

(*) Notice: Subject to any disclaimer, the term of this patent is extended or adjusted under 35 U.S.C. 154(b) by 532 days.

(21) Appl. No.: 14/562,932

(22) Filed: Dec. 8, 2014

(65) Prior Publication Data
US 2015/0210871 A1    Jul. 30, 2015

Related U.S. Application Data

(63) Continuation of application No. PCT/EP2013/059168, filed on May 2, 2013.

(51) Int. Cl.
| | |
|---|---|
| C09D 11/102 | (2014.01) |
| C09D 183/02 | (2006.01) |
| C03C 1/06 | (2006.01) |
| C09D 11/037 | (2014.01) |
| C09B 67/46 | (2006.01) |
| C03C 17/42 | (2006.01) |

(52) U.S. Cl.
CPC ............ *C09D 11/102* (2013.01); *C03C 17/42* (2013.01); *C09B 67/009* (2013.01); *C09B 67/0084* (2013.01); *C09D 11/037* (2013.01); *C09D 183/02* (2013.01); *C03C 2217/485* (2013.01); *C03C 2217/72* (2013.01); *C03C 2218/113* (2013.01)

(58) Field of Classification Search
CPC .................................................... C09D 11/102
USPC ........................................................ 524/858
See application file for complete search history.

(56) References Cited

U.S. PATENT DOCUMENTS

| 4,785,041 A | 11/1988 | Antonen et al. |
| 6,863,923 B1 | 3/2005 | Kalleder et al. |
| 2006/0229408 A1 | 10/2006 | Shimizu et al. |
| 2007/0017402 A1* | 1/2007 | Jordens ................. C03C 17/007 101/491 |

FOREIGN PATENT DOCUMENTS

| DE | 19946712 A1 | 4/2001 |
| DE | 10313630 A1 | 10/2004 |
| DE | 102007025590 A1 | 12/2008 |

(Continued)

OTHER PUBLICATIONS

German Office Action dated Apr. 11, 2014 for corresponding German Patent Application No. 10 2012 111 514.1 with English Translation, 12 pages.

(Continued)

*Primary Examiner* — Vu A Nguyen
(74) *Attorney, Agent, or Firm* — Ohlandt, Greeley, Ruggiero & Perle, LLP

(57) ABSTRACT

A method for producing a sol-gel ink, in particular from TEOS and MTEOS, is provided. The method includes adding inorganic particles as a filler and adding a high-boiling solvent.

17 Claims, 9 Drawing Sheets
(2 of 9 Drawing Sheet(s) Filed in Color)

(56) References Cited

FOREIGN PATENT DOCUMENTS

| | | | |
|---|---|---|---|
| DE | 102009004784 A1 | 7/2010 | |
| DE | 102011050870 A1 | 12/2012 | |
| WO | 0123190 A1 | 4/2001 | |
| WO | WO 2011085996 A1 * | 7/2011 | ............. C03C 1/008 |
| WO | 2011144671 A1 | 11/2011 | |

OTHER PUBLICATIONS

English translation of International Search Report dated Oct. 21, 2013 for corresponding International Patent Application No. PCT/EP2013/059168, 3 pages.

Written Opinion of the International Searching Authority dated Oct. 21, 2013 for corresponding International Patent Application No. PCT/EP2013/059168, 5 pages.

English translation of the International Preliminary Report on Patentability from the International Bureau dated Sep. 23, 2014 for corresponding International Patent Application No. PCT/EP2013/059168, 3 pages.

* cited by examiner

Calculation of fractale dimension
Assumption: d50 (primary particle)= 50 nm

SOL-GEL INK AND METHOD FOR PRODUCING SAME

CROSS REFERENCE TO RELATED APPLICATIONS

This application is a continuation of International Application Serial No. PCT/EP2013/059168 filed May 2, 2013, which claims benefit under 35 U.S.C. § 119(a) of German Patent Application No. 10 2012 104 932.7 filed Jun. 6, 2012 and German Patent Application No. 10 2012 111 514.1 filed Nov. 28, 2012, the entire contents of all of which are incorporated herein by reference.

BACKGROUND

1. Field of the Disclosure

The invention relates to an ink containing a sol-gel binder and to a method for producing such ink. More particularly the invention relates to a pigmented ink which is suitable for decorative printing on glass and glass ceramic plates, such as cooktops.

2. Description of Related Art

A number of ways are known to apply a decorative coating on glass ceramics.

For example, there are metal layers that are deposited by a sputtering process. A disadvantage therein is that the design options are limited, in particular with respect to the desired color. For example it is not possible to use effect pigments for coloration purposes. Moreover, partial coating of a substrate, for example, which may be accomplished using masks, is time-consuming and complex.

Furthermore, there are silicone based pigmented coatings. However, these coatings often exhibit insufficient mechanical resistance and poor adhesion and are prone to discoloration under very high temperature loads (>400° C.).

Also, pigmented glass fluxes can be used, in particular for coating cooktops. However, glass flux based coatings must have a certain porosity, so as not to reduce the strength of the substrate under thermal and mechanical stress. Since the pore size is in the range of the wavelength of visible light, only a matt decorative layer can be produced in this way.

Furthermore it is possible to apply luster paints or noble metal layers on glass ceramic plates. In this way, in turn, only a reflective appearance can be achieved. The use of effect pigments for coloration is not possible. Moreover, when applying the layers the risk of defect site formation is quite large, which significantly increases discards. In addition, opaque layers have to be realized either through a large layer thickness or by printing a further layer, which is complex and costly.

Sol-gel coatings based on a sol-gel binder and including platelet-shaped pigments as a coloring component are also known from practice. However, known sol-gel inks have rather poor use properties. In particular the pot life which is the time within which the ink can be processed is usually low and is often less than six weeks. Moreover, the sol-gel layers exhibit discoloration or decoloration under a temperature load of more than 400° C. Also, the mechanical resistance of the layers is usually not optimal. The scratch resistance of the layers, for example, is often less than 500 g in the Bosch-Siemens home appliances test. Also, the layers may detach already under a temperature load from 200 to 300° C., depending on the pigmentation.

Known sol-gel inks for coating glass ceramics, in particular cooktops, usually represent a non-optimal compromise between processability and handling properties of the ink, the desired pot life, desired impermeability to contact media, desired visual appearance, and resistance, especially to elevated temperatures.

These sol-gel inks are usually based on a pigmented sol-gel network which additionally contains methyl- and/or phenyl-functionalized polysiloxane resins. The combination of a sol-gel network with a mostly hydroxyl- and/or alkoxide-functionalized polysiloxane network entails a continuous aging reaction which on the basis of hydrolysis and condensation reactions causes gelling and hence a short shelf life (pot life) of the sol-gel inks.

Documents DE 196 50 139 C1, DE 10 2006 002 246 A1, and EP 0 938 457 B1 disclose high-temperature resistant coating materials.

SUMMARY

The invention is therefore based on the object to eliminate or at least mitigate the aforementioned drawbacks of the prior art.

A particular object of the invention is to provide a sol-gel based ink which is suitable for coating temperature-stressed substrates and which exhibits imperviousness to contact media, a sufficiently long pot life, and no alteration of the color location under temperature load.

Specifically, it is an object of the invention to provide a long-term stable pigmented screen-printable sol-gel ink which is suitable for manufacturing cooktops for induction cooking appliances and/or gas cooktops.

The object of the invention is achieved by a method for producing a sol-gel ink and by a sol-gel ink according to the present disclosure.

The invention relates to a method for producing a screen-printable sol-gel ink. A sol-gel ink refers to an ink which is produced from a sol-gel precursor, one or more solvents, pigments, and optionally adjuvants and pasting agents.

The sol-gel precursor is prepared by hydrolysis and condensation of a silane or a silane mixture with the addition of an aqueous dispersion of colloidal particles.

In the present case, a first hydrolyzable silane of the formula $R_nSiX_{(4-n)}$ and a further hydrolyzable silane $SiX_4$ is used. Here, R is an aliphatic or aromatic radical, and X is a hydrolytically cleavable group. n takes values between 1 and 3, and it will be understood that besides tertiary (n=1) and secondary (n=2) and singular (n=3) silanes mixtures thereof may also be used.

By hydrolysis of X and subsequent condensation of two hydrolyzed groups X or of one hydrolyzed and one non-hydrolyzed group X, a hybrid polymeric sol-gel network is formed. The hydrolytically cleavable group preferably is an alkoxide group, in particular a methoxy, ethoxy, or buthoxy group. But it is also possible to use a halogen such as chlorine or bromine as the hydrolytically cleavable group.

The molar fraction of aliphatic or aromatic radical groups and the molar fraction of the amount of water available for the reaction can be used to adjust how tightly meshed this network will be. It will be understood that within the meaning of the above definition R does not always necessarily have to be the same radical group, rather silanes having several different radical groups or mixtures of silanes with different radical groups may likewise be used.

Further, inorganic particles, in particular nanoparticles are added to the sol-gel precursor, as a filler. These inorganic particles are preferably added to the sol-gel precursor in colloidal form as an aqueous dispersion during hydrolysis and condensation.

The particles used are irregularly shaped particles, that is to say particles that do not have the shape of a regular geometric body, also known as Platonic body. That means, in particular no spherical particles are used.

Rather, the particles that are preferably used are in form of secondary particles which in turn are composed of aggregated primary particles of a smaller mean particle size.

In aggregates, in contrast to agglomerates, the particles form a solid composite and it is impossible to separate the primary particles from each other for example by stirring in a liquid. Such particles are in particular produced by flame pyrolysis.

The particles typically have an irregular, branched shape.

Preferably, the primary particles have a mean particle size between 10 and 80 nm, whereas the secondary particles have a mean particle size of more than 100 nm along the direction of their greatest dimension.

The shape of the particles may be characterized by their fractal dimension (according to Mandelbrot). In this case, the secondary particles are considered in three dimensions. The exact calculation and characterization will be explained in more detail below.

In one embodiment of the invention, the particles have a fractal dimension from 1.5 to 3.0, preferably from 2.0 to 3.0, and more preferably from 2.0 to 2.5.

Inorganic particles are preferably employed, most preferably oxidic particles. Preference is given to particles of $SiO_2$ and/or $Al_2O_3$ and/or $SiO_2/Al_2O_3$, $TiO_2$, $ZrO_2$, Y-stabilized $ZrO_2$, Ca-stabilized $ZrO_2$, Mg-stabilized $ZrO_2$, $SnO_2$, $ZnO_2$, MgO, boehmite, andalusite, mullite, and or mixed oxides thereof.

In one specific embodiment, amorphous and/or semi-crystalline colloidally dispersed $Al_2O_3$ particles are used.

Particularly preferred are semi-crystalline $Al_2O_3$ particles including a delta-$Al_2O_3$ phase with defect spinel structure. The $Al_2O_3$ particles which are particularly preferred further include tetrahedrally and/or octahedrally configured aluminum.

In one particular embodiment, the particles are surface-stabilized, for example by para-toluenesulfonic acid.

The employed particles may be produced by grinding processes, aerosol processes such as flame hydrolysis and spray pyrolysis, precipitation reaction, sol-gel reaction, Stöber process, plasma processes, and hydrothermal processes.

In one embodiment, the sol-gel precursor is mixed with further inorganic particles in suspension, in particular in an alcoholic or aqueous suspension.

The inorganic particles serve to minimize shrinkage during subsequent drying and baking processes. Only this makes it possible to produce pigmented sol-gel layers, since in this manner no shrinkage cracks will occur under thermal stress and thus the color location of the layer will not change under thermal stress.

Furthermore, functionalization with nanoscale aluminum oxide particles results in an improvement of the thermal stability of the Si—R (methyl, phenyl) bond. In contrast to the use of nano-scale $SiO_2$ particles, for example, when using particles produced by flame pyrolysis as a filler, the thermal stability of the hybrid polymeric network can be increased by 50° C.

Additionally, a solvent is added to the sol-gel precursor, which solvent has a boiling point of more than 120° C. and an volatility of >10. Preferably, a solvent having a boiling point above 150° C. and an volatility of >500 is used, more preferably with a boiling point above 200° C. and an volatility of >1000. Such high-boiling solvents in particular include glycols and glycol ethers, terpenes, and polyols, and mixtures of several of these solvents. Solvents that may be used include butyl acetate, methoxybutyl acetate, butyl diglycol, butyl diglycol acetate, butyl glycol, butyl glycol acetate, cyclohexynone, diacetone alcohol, diethylene glycol, dipropylene glycol monomethyl ether, dipropylene glycol monobutyl ether, propylene glycol monobutyl ether, propylene glycol monopropyl ether, propylene glycol monoethyl ether, ethoxypropyl acetate, hexanol, methoxypropyl acetate, mono-ethylene glycol, ethylpyrrolidone, methylpyrrolidone, dipropylene glycol dimethyl ether, propylene glycol, propylene glycol monomethyl ether, mixtures of paraffinic and naphthenic hydrocarbons, aromatic hydrocarbon mixtures, mixtures of aromatic alkylated hydrocarbons, and mixtures of n-, i- and cyclo-aliphatic compounds. In particular, polyethylene glycol ethers such as e.g. diethylene glycol monoethyl ether, tripropylene glycol monomethyl ether, and terpineol may be used as the solvent.

The solvents may be added to the sol-gel precursor as well as to the pigmented ink.

By removing and/or partially removing volatile solvents which for example are produced during hydrolysis and condensation of the sol-gel precursor, the sol-gel binder is obtained. This ensures that the sol-gel ink is screen-printable.

Furthermore, pigments are added to the sol-gel binder in order to achieve the desired color appearance. Virtually any known pigments can be used for this purpose.

In particular platelet-shaped pigments are used, such as coated mica, graphite, or a mixture of mica and graphite. For example synthetic graphite of a size from 1 to 40 µm may be used.

Solid lubricants or boron nitride may also be used.

Non-platelet-shaped pigments may likewise be used. These may include colorizing pigments, for example.

Preferably, thermally stable inorganic pigments may be used, such as those known from enamel coatings of cooktops or from glass coatings. These may be coatings based on e.g. $TiO_2$, spinels, CrCu spinels, Fe spinels, mica, mica-based effect pigments with e.g. $SiO_2$ and/or $TiO_2$ and/or $Fe_2O_3$ and/or $SnO_2$.

For coloration purposes, organic colorants may also be added to the binder.

To improve screen printability, dispersibility and in order to avoid defects and Bernard cells, the sol-gel binder may be mixed with adjuvants and pasting agents, defoamers, deaeration agents, leveling agents, wetting and dispersing additives, lubricants, leveling and substrate wetting additives.

In this manner, a sol-gel based ink was produced having a pot life of at least 3 months, preferably at least 6 months, and more preferably at least 1 year.

The inorganic particles used are preferably non-metal oxide or metal oxide particles. Preferably, the aggregated particle size is between 4 and 500 nm. Specifically, nanoscale fillers having an average aggregated particle size between 8 and 200 nm are preferably used, most preferably between 10 and 150 nm. In particular nanoscale filler particles of the oxides or hydroxides of Si, Al, B, Zn, Ti, or Zr may be used. A particularly preferred embodiment of the invention uses aluminum oxide particles.

The preferably employed inorganic filler particles have an average primary particle size from 1 to 50 nm, preferably from 4 to 30 nm. The average primary particle size and the average aggregated particle size are determined by a statistical analysis of scanning electron micrographs.

The filler particles may consist of amorphous, semi-crystalline, or crystalline materials.

Crystalline and/or semi-crystalline filler particles may for example consist of magnesium fluoride, magnesium oxyfluoride, calcium fluoride, cubic zirconia, tetragonal zirconia, monoclinic zirconia, anatase, rutile, alumina spinels, alpha alumina, gamma alumina, boehmite, and/or silicon oxide.

In a preferred embodiment the filler particles comprise more than 70%, preferably more than 90% of amorphous inorganic components.

The filler particles may be produced, for example, by base-catalytic hydrolysis and condensation, as well as by pyrogenic and thermal manufacturing processes.

Particularly preferred are particles produced by gas phase processes, preferably by flame pyrolysis, that have a mean particle size (aggregated size) from 50 to 500 nm, preferably from 100 to 200 nm.

The mean primary particle size of the particles produced by gas phase processes, preferably by flame pyrolysis, is from 1 to 50 nm, preferably from 4 to 30 nm. In particular aluminum oxide particles may be used which include substantially spherical and/or peanut-shaped primary particles.

In one embodiment, the particles produced by flame pyrolysis are provided in form of aggregates. In this case, the primary particle size is always considerably smaller than the aggregated size of the particles.

In one embodiment, the nanoscale filler particles which are present during hydrolysis and condensation of the sol-gel network have an at least partially chain-like and/or peanut-shaped or partially branched particle morphology. This particle morphology, for example of the aluminum oxide or silicon oxide, leads to a particularly good processability and improved rheology of the sol-gel ink.

The employed filler particles preferably have a BET surface area from 30 to 300 $m^2/g$, more preferably from 50 to 200 $m^2/g$, as determined by the method of $N_2$ sorption.

In one embodiment, the aluminum oxide particles are non-covalently incorporated into the sol-gel network, so that no Si—O—Al bond is detectable by means of NMR spectroscopy.

In a further embodiment, an additional pseudoplastic or thixotropic effect occurs due to the incorporation of solvent molecules into free network interstices.

In one preferred embodiment of the invention, the ratio of $R_nSiX_{(4-n)}$ to $SiX_4$ is from 2 to 6. It has been found that with this ratio of tertiary to quaternary silane or to the further silanes with or without radical groups a network is formed which is much less prone to gelling and provides for long pot lives.

The first hydrolyzable silane used is in particular a tertiary silane, i.e. $RSiX_3$.

In one preferred embodiment of the invention, an acidic catalyst is added for the hydrolysis and condensation during the preparation of the sol-gel ink, in particular the aqueous dispersion is adjusted to a pH of less than 3. In particular a concentrated or diluted mineral acid or para-toluenesulfonic acid may be used as the acidic catalyst. The final ink preferably includes an amount of less than 5%, more preferably less than 3% of the acidic catalyst (percentages always in wt %, unless otherwise stated).

The degree of condensation of the hybrid network is preferably adjusted to a value between 70 and 95%, preferably between 70 and 90%, and more preferably between 70 and 80%. The degree of condensation of a hybrid polymeric network can be determined by $^{29}Si$ NMR spectroscopy.

The degree of condensation may be adjusted by varying the synthesis parameters such as the reaction temperature during hydrolysis, the amount of water in the aqueous dispersion, and the mentioned ratio of the first silane to the further silane. The amount of water is specified by the ROR value which is defined as the molar ratio of water to hydrolyzable groups.

For example, by adjusting the ROR value in a range from 0.35 to 0.5, a condensation degree of the tertiary groups CD(T) from 70 to 95% can be adjusted after one week of aging of the sol.

Depending on the degree of hydrolysis and condensation, a distinction is made between $T^0$, $T^1$, $T^2$, $T^3$ groups, and $Q^0$, $Q^1$, $Q^2$, $Q^3$, and $Q^4$ groups. Depending on the distribution of each of the T and Q groups, a predominantly linear, more or less crosslinked three-dimensional network may be produced. By varying the synthesis parameters, the distribution of the T groups and Q groups can be adjusted. For example it is possible to adjust such properties of the decorative layers according to the invention as impermeability, tendency to discoloration, and pot lives. For example, thermally stable methyl groups can ensure impermeability to aqueous and oily media even at high temperatures (T=500° C.).

When preparing the sol-gel precursor, first a crosslinked sol-gel material may be produced using the first and the further silane and the inorganic particles. Then the high-boiling solvent is added.

For preparing a screen-printable sol-gel binder, part of and/or all of the low-boiling components, in particular alcohol and/or water, are removed in an amount from 40 to 100%, more preferably from 60 to 100%, most preferably from 60 to 90%, prior to or after the addition of the high-boiling solvent.

Surprisingly it has been found that although volatile solvent components are still included, good screen printability is achieved.

Below, liquid phase refers to the fraction of high-boiling solvents and volatile solvents. Solids content refers to the fraction of crosslinked Si-based methyl- and/or phenyl-functionalized sol-gel material, uncondensed silanes, and para-toluenesulfonic acid.

In a preferred embodiment of the sol-gel binder, the liquid phase preferably includes from 80 to 100% of high-boiling solvent.

The residual content of solvents in the liquid phase released in the sol-gel reaction is preferably less than 20%, more preferably less than 10%.

Preferably, the sol-gel binder is prepared with a solids content from 35 to 55%, more preferably from 35 to 50%, most preferably from 40 to 50%, and accordingly with a liquid content from 45 to 65%, more preferably from 50 to 65%, most preferably from 50 to 60%.

Preferably, the solids content in the sol-gel binder is composed of 50 to 95 mass % of Si-based methyl- and/or phenyl groups-functionalized sol-gel material mixed with 3 to 10 mass % of nanoscale filler particles and 2 to 7 mass % of para-toluenesulfonic acid.

In one embodiment, a thermally stable phenyl- and/or methyl-functionalized siloxane resin and/or silsesquisiloxane resin may be added to the sol-gel binder as an additional binder. The resin may represent from 0 to 50 mass % of the solids content of the total binder fraction.

The viscosity of the binder is preferably between 5 and 50 mPa·s, more preferably between 5 and 35 mPa·s, most preferably between 5 and 20 mPa·s. Preferably, the sol-gel binder exhibits a Newtonian or pseudoplastic behavior, most preferably Newtonian behavior.

In the binder employed, the methyl groups should have a thermal stability of at least 500° C.

This guarantees a minimal VOC content in an application case when used as a cooktop.

By varying the mass fractions of the individual components it is possible to adjust the rheology of the pigmented ink in view of its particular use as a paste for a screen printing process.

The viscosity of the pigmented ink is preferably between 1000 and 5000 mPa·s

Preferably, the sol is adjusted to an ROR value (molar ratio of water to hydrolyzable groups) of less than 0.45, more preferably less than 0.4.

The inventors have found that by reducing the ROR value, the pot life of the sol-gel binder and of the pigmented sol-gel ink produced therewith can be increased by several times.

In one embodiment of the invention, a sol-gel ink including a sol-gel binder is provided, which is based on a sol-gel network having a ratio of tertiary to quaternary groups from 2 to 6, preferably from 3 to 5, more preferably from 3.5 to 4.5.

The ink includes a crosslinked sol-gel binder exhibiting a degree of condensation of less than 90% and a viscosity between 10 and 100 mPa·s.

The invention permits to provide a sol-gel binder which preserves its viscosity from 10 to 100 mPa·s during a storage at room temperature over a period of more than 10 weeks, preferably more than 15 weeks, and most preferably more than 20 weeks.

The sol-gel binder and the pigmented sol-gel ink produced therewith include a solvent having a boiling point above 120° C.

The invention permits to provide a sol-gel-based ink which is substantially free of polysiloxane resin, in particular having a polysiloxane content of less than 5%.

In the dried state, the secondary particles of the irregular particles exist as dried agglomerates of lower fractal dimension. The latter ranges from 1.0 to 2.0, preferably from 1.5 to 2.0, and most preferably from 1.7 to 2.0.

In a preferred embodiment of the invention, the ink of the invention is used for printing on an object in a screen printing process.

Especially, the sol-gel ink is intended for bottom surface coating of a glass ceramic plate, in particular a cooktop.

The sol-gel ink is particularly suitable for producing a cooktop for induction and/or gas applications, that is decorated on its upper and/or lower surfaces.

In particular, the sol-gel ink is suitable for coating cooktops which additionally have a transparent recess for display windows and/or comprise colorized and/or pigmented semi-transparent layers for LED displays.

In one specific embodiment, glass, glass ceramic, or ceramic substrates having a thermal coefficient of linear expansion from 0 to $4.5 \times 10^{-6}$ $K^{-1}$ are used as transparent substrates.

The invention permits to provide an ink with a pot life of at least 6 months without the addition of polysiloxane.

Furthermore, it is possible to apply a sealing layer on the ink. This sealing layer may be baked at between 230 and 450° C., for example.

For example a sol-gel layer may be applied as the sealing layer. Also, in particular a pigmented sol-gel layer or a silicone ink may be applied. Also, sealing layers on the basis of methyl-phenyl or methyl-phenyl silicone resin may be used.

The percentages of the T and Q groups in the sol-gel binder preferably have ratios as follows: $T_3/(T_2+T_1+T_0)$ is preferably from 0.2 to 2.0, more preferably from 0.2 to 1.0. $(Q_4+Q_3)/(Q_2+Q_1+Q_0)$ is preferably from 0.3 to 3.0, more preferably from 0.3 to 1.0.

Furthermore, $T_3/(T_2+T_1+T_0)<(Q_4+Q_3)/(Q_2+Q_1+Q_0)$ is preferably satisfied for the hybrid polymer network.

For producing an ink according to the invention, MTEOS (methyl triethoxysilane) may be used as the first hydrolyzable silane, for example, and TEOS (tetraethyl orthosilicate) as the further hydrolyzable silane.

With a MTEOS/TEOS ratio of about 4, a pot life of the sol-gel binder of more than 10 months was achieved.

BRIEF DESCRIPTION OF THE DRAWINGS

The patent or application file contains at least one photograph. Copies of this patent or patent application publication with the photograph(s) will be provided by the Office upon request and payment of the necessary fee.

DETAILED DESCRIPTION

The subject matter of the invention will now be explained in more detail by way of schematically illustrated exemplary embodiments and with reference to the drawings.

Figure 1:
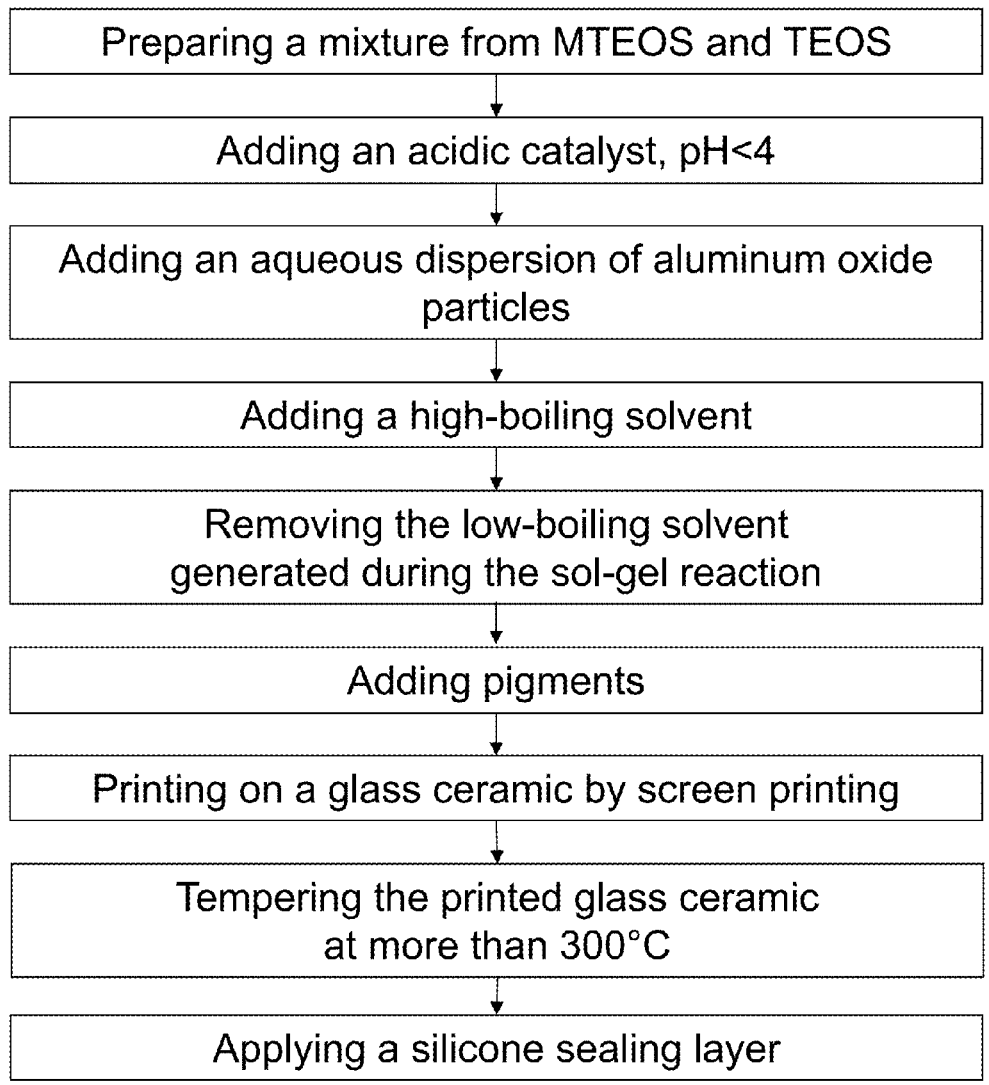
FIG. 1 shows a flow chart of one exemplary embodiment of a method for producing a sol-gel ink according to the invention.

FIG. 1 shows a flow chart of one exemplary embodiment of a method for producing a sol-gel ink according to the invention.

First, a mixture of MTEOS and TEOS is prepared.

Then, the pH of the mixture is adjusted to less than 4 using an acidic catalyst.

As filler particles, an aqueous dispersion of aluminum oxide particles is added. Now, a sol-gel network is being formed by hydrolysis and condensation of MTEOS and TEOS, with a degree of crosslinking that is controlled through the ROR value and the MTEOS/TEOS ratio.

Once the desired degree of condensation has been reached, a high-boiling solvent is added.

Low-boiling solvent generated during the sol-gel reaction may then be removed, so that a solvent exchange occurred.

Then, pigments are added to the ink.

The ink may then be used to print on a glass ceramic by screen printing.

The printed glass ceramic may be tempered at more than 300° C., and the temperature may be increased such that organic components of the sol-gel ink are largely removed.

Finally, a silicone sealing layer may be applied.

In detail, a sol-gel ink may be produced and further processed according to the following exemplary embodiments:

Example 1

For the synthesis of the sol-gel precursor, MTEOS and TEOS are provided in a molar ratio of 4:1, for example, and are adjusted to a pH of about 2 by addition of an acid, in particular para-toluenesulfonic acid.

Then, a 30% aqueous dispersion of $Al_2O_3$ particles (30% solids content) (diameter of about 120 nm) is added under vigorous stirring. The ROR value is 0.425.

For the synthesis of the matrix, the sol-gel precursor having a condensation degree of 85% and a $T_3/(T_2+T_1+T_0)$ ratio of about 1.8 and a $(Q_4+Q_3)/(Q_2+Q_1+Q_0)$ ratio of about 3.0 is combined with a solvent mixture of terpineol and n-butyl acetate in a ratio of 4:1, for example.

Here, the solvent content is 40%, for example. By removing the ethanol, the sol-gel binder is obtained with a content of $T_3$ groups of about 55% and a content of $Q_4$ groups of about 10%. The degree of condensation is about 90±5% over a period of six months when stored at 7° C.

For the synthesis of the ink, the matrix (60-65%), DEGMEE (diethylene glycol monoethyl ether) (about 9%), mica pigments (about 24%), graphite (5%), and adjuvants or pasting agents (about 2%) are stirred together.

Using a 77 mesh screen, a decorative layer is applied onto the substrate by screen printing and is then tempered at 450° C.

Subsequently, the coating is sealed by a methyl/phenyl silicone sealing layer that is pigmented with mica and graphite, inter alia. The coating is dried at 400° C.

Example 2

For the synthesis of the trisol, MTEOS and TEOS are provided in a molar ratio of 4:1, for example, and are adjusted to a pH of about 2 by adding para-toluenesulfonic acid. Then, a 30% aqueous dispersion of $Al_2O_3$ particles is added under vigorous stirring. The ROR value is 0.375.

For the synthesis of the matrix, the sol-gel precursor having a condensation degree of 76% and a $T_3/(T_2+T_1+T_0)$ ratio of about 1.0 and a $(Q_4+Q_3)/(Q_2+Q_1+Q_0)$ ratio of about 1.5 is combined with a solvent mixture of terpineol and n-butyl acetate in a ratio of 4:1, for example.

Here, the solvent content is 40%, for example. By removing the ethanol, the sol-gel binder is obtained with a content of $T_3$ groups of about 45% and a content of $Q_4$ groups of about 5 to 7%. The degree of condensation is about 78%.

The degree of condensation is preserved below 85% for six months when stored at 7° C.

For the synthesis of the ink, the matrix (60-65%), DEGMEE (about 9%), mica pigments of a size of 15 μm (about 20%), synthetic graphite of a size of 5 μm (9%), and adjuvants or pasting agents (about 2%) are stirred together.

Using a 77 mesh screen, a decorative layer is applied onto the substrate by screen printing and is then tempered at 450° C.

Subsequently, the coating is sealed by a methyl/phenyl silicone sealing layer that is pigmented with mica and graphite, inter alia. The coating is dried at 400° C.

Figure 2:
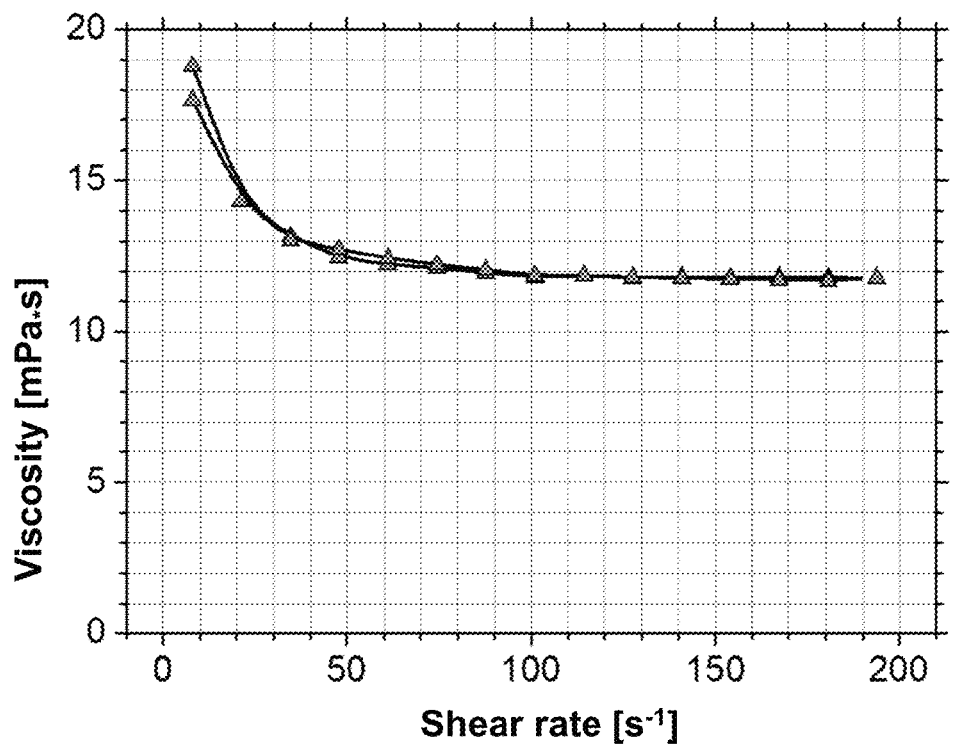
FIG. 2 shows the viscosity of a sol-gel binder according to the invention after one week.

FIG. 2 shows the viscosity of a sol-gel binder according to the invention after one week. The x-axis represents the shear rate in $s^{-1}$, the y-axis represents the viscosity in mPa·s.

It can be seen that the viscosity decreases with increasing rotational speed, that means the ink is pseudoplastic and is easily applied by screen printing.

Due to the incorporation of solvent molecules in the free interstices of the sol-gel network, a weak thixotropic effect occurs at low shear rates (<20 $s^{-1}$).

Figure 3:
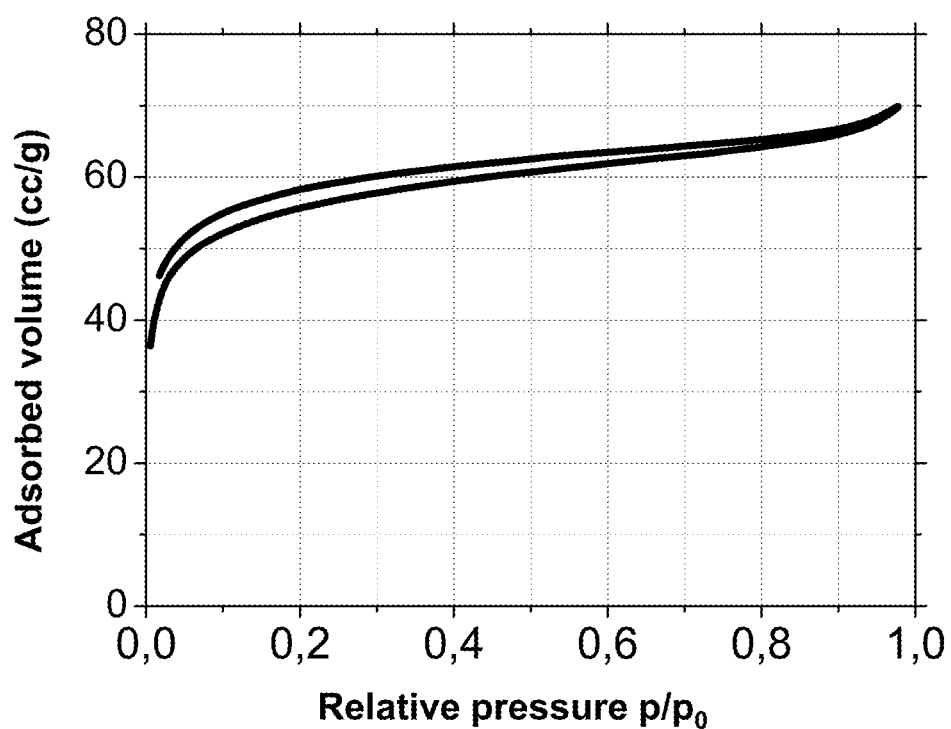
FIG. 3 shows the nitrogen sorption isotherms of a pigmented layer after baking.

FIG. 3 shows the nitrogen sorption isotherms of a pigmented layer after baking at 450° C. The x-axis represents the relative pressure in $p/p_0$, and the y-axis represents the adsorbed volume in $cm^3/g$. The nitrogen sorption isotherms have a type I profile as classified according to IUPAC, which is characteristic of micropores (d<2 nm). At the same time, the nitrogen sorption isotherms reveal indications of a type IV profile which is typical for mesopores (d>2 nm). Thus, there is a bimodal pore distribution existing in the layer system.

By varying the ROR value, the specific surface area of the layers may be adjusted selectively.

Figure 4:
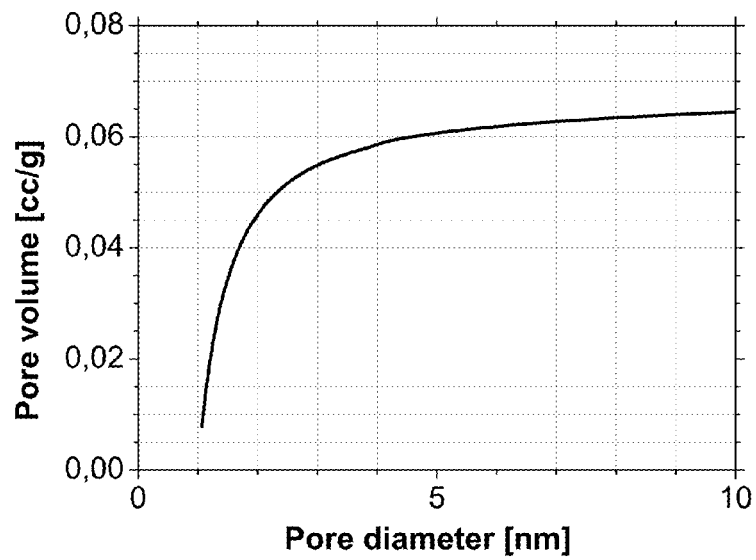
FIG. 4 shows the pore volume distribution of a pigmented layer after baking.

FIG. 4 shows the pore volume distribution of a pigmented layer after baking at 450° C., which depends on the ROR value of the sol-gel binder used for producing the ink.

The x-axis represents the pore diameter in nanometers, and the y-axis represents the pore volume in $cm^3/g$. The profile confirms a bimodal pore distribution. Approximately ⅔ of the pore volume is attributable to micropores, about ⅓ to mesopores.

Figure 5:
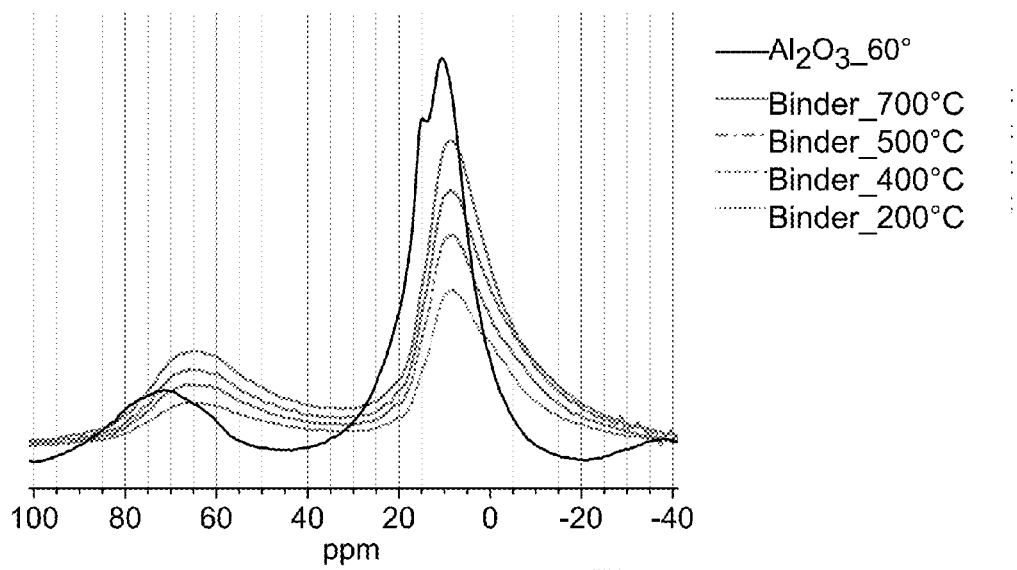
FIG. 5 illustrates Al NMR measurements of the employed pure aluminum oxide particles dried at 60° C. and of the sol-gel binder as a function of the baking temperature.

FIG. 5 illustrates Al NMR measurements of the employed pure aluminum oxide particles dried at 60° C. and of the sol-gel binder as a function of the baking temperature.

It can be seen that the pure aluminum oxide particles substantially comprise tetragonally and predominantly hexagonally coordinated aluminum.

At a baking temperature above 200° C., the sol-gel binder predominantly comprises hexagonally coordinated aluminum and a low fraction of tetragonally coordinated aluminum.

Figure 6:
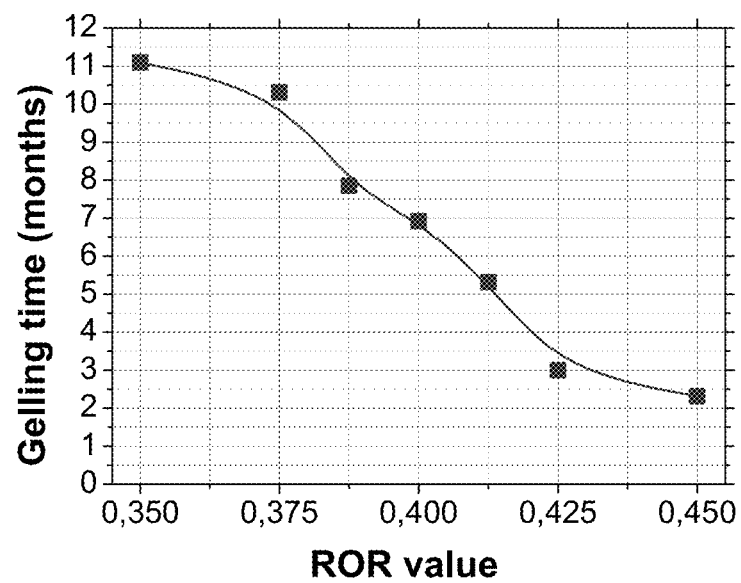
FIG. 6 illustrates the gelling times of the sol-gel binder as a function of the ROR value.

FIG. 6 illustrates the gelling times of the sol-gel binder as a function of the ROR value. The x-axis represents the ROR value of the sol-gel binder, and the y-axis represents the corresponding gelling time in months. With the ROR value decreasing, the gelling time or pot life of the binder increases significantly.

Figure 7:
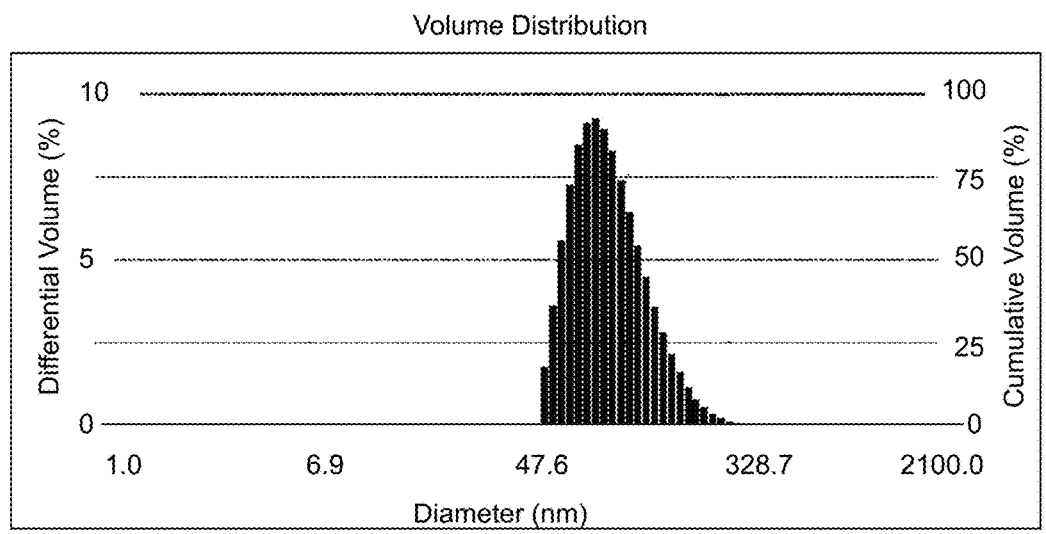
FIG. 7 shows the result of a dynamic light scattering measurement of a $3.3 \times 10^{-5}$% dispersion in water of nanoscale $Al_2O_3$ produced by flame pyrolysis.

FIG. 7 shows the result of a dynamic light scattering measurement of a $3.3×10^{-5}$% dispersion in water of nanoscale $Al_2O_3$ produced by flame pyrolysis.

These particles may be added during the preparation of the sol-gel ink, for example.

The measurement by dynamic light scattering reflects the diameter of the secondary particles.

The x-axis represents the diameter in nanometers, and the y-axis represents the differential volume. It can be seen that the diameter is substantially distributed from about 50 nanometers to about 300 nanometers. $D_{50}$ is 115 nanometers.

Figure 8:
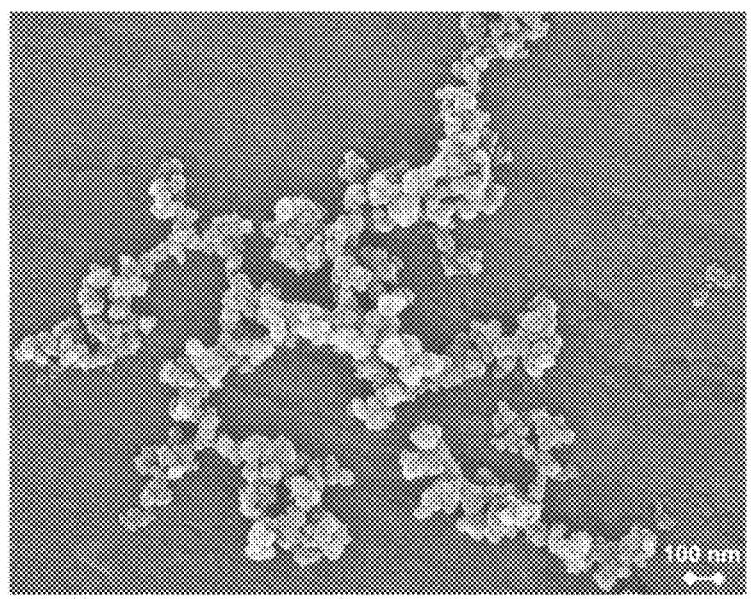
FIG. 8 shows an SEM image of a diluted dispersion that was dropped on a support and then dried.

FIG. 8 shows an SEM image of a diluted dispersion that was dropped on a support and then dried.

The SEM image shows dried agglomerates in which the secondary particles are agglomerated.

Such dried agglomerates may be redispersed, whereas the secondary particles are stable.

Figure 9:
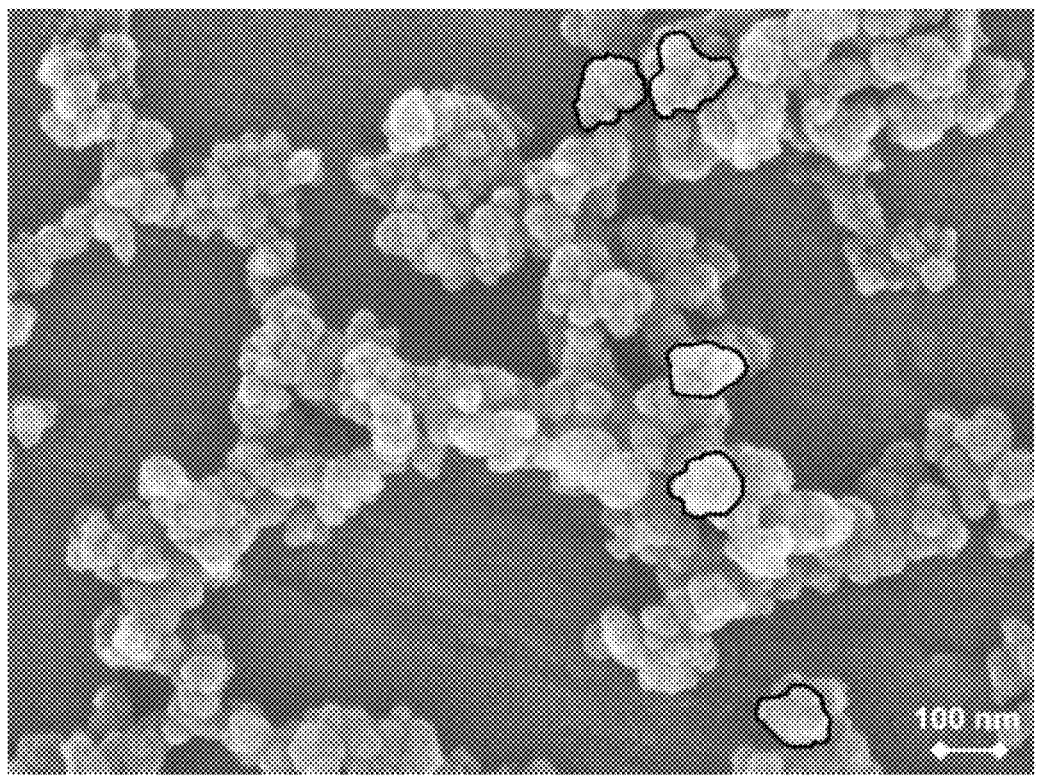
FIG. 9 shows another SEM image in which some secondary particles are outlined in black.

FIG. 9 shows another SEM image in which some secondary particles are outlined in black.

The diameter of the primary particles is about 10 to 80 nanometers. These primary particles are agglomerated into secondary particles with $d_{50}$=150 nm. The dried agglomerates have a size of more than 200 nanometers.

Figure 10:
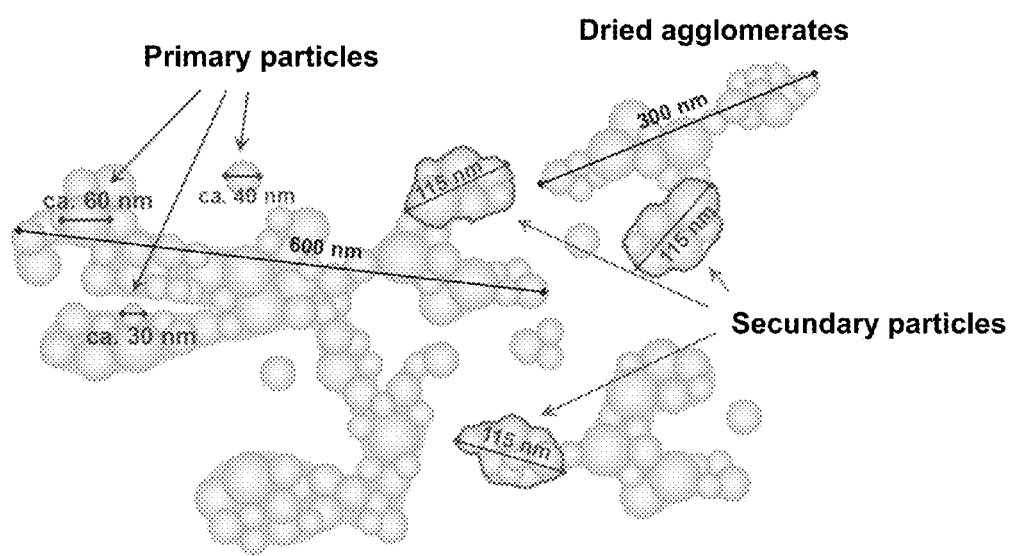
FIG. 10 is a schematic illustration in which the primary particles are indicated.

FIG. 10 is a schematic illustration in which the primary particles are indicated, which in this case have a diameter between 30 and 60 nanometers. Furthermore, secondary particles are measured along the direction of their largest dimension which is about 115 nanometers. The dried agglomerates are considerably larger, i.e. up to 600 nanometers.

Figure 11:
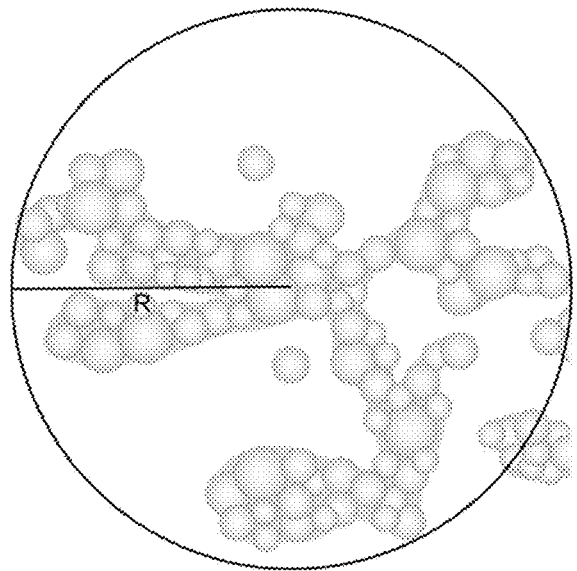
FIG. 11 illustrates the fractal dimensions of three exemplary secondary particles.
Figure 11:
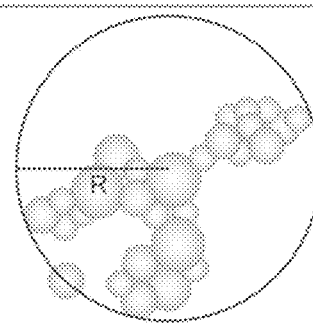
Figure 11:

Referring to FIG. 11, the calculation of the fractal dimension according to Mandelbrot will be described in more detail. The fractal dimension is determined from SEM studies. Here, the secondary particles are considered in three dimensions. At least 10 randomly selected secondary particles are taken, and their fractal dimension is determined. From these measurements the average is calculated.

The fractal dimension is calculated using the following formula:

Fractal dimension $D = \ln N / \ln(R/r)$, where N is the number of primary particles, r is the radius of the primary particles, and R is the radius of the secondary particle.

FIG. 11 illustrates three exemplary secondary particles for which the fractal dimension has values of 1.78, 1.9, and 2.21, respectively.

The invention relates to a sol-gel ink in which preferably one half of the secondary particles have a fractal dimension from 2.0 to 2.5.

In the dried ink, dried agglomerates of a lower fractal dimension will form, in particular in a range from 1.7 to 2.0.

What is claimed is:

1. A method for producing a sol-gel ink to be processed by screen printing, the method comprising:
   preparing a sol-gel precursor from inorganic irregularly shaped particles as a filler, a first hydrolyzable silane $R_nSiX_{(4-n)}$, and a further hydrolyzable silane $SiX_4$, wherein R is an aliphatic or aromatic radical and X is a hydrolytically cleavable group;
   removing volatile solvents that are generated during hydrolysis and condensation of the sol-gel precursor;
   mixing into a dispersion a solvent having a boiling point above 120° C. and the sol-gel precursor, to form a sol,
   adjusting the sol to a ROR value that is a molar ratio of water to hydrolyzable groups of less than 0.45; and
   adding pigments,
   wherein the inorganic irregularly shaped particles have a fractal dimension from 2.0 to 3.0.

2. The method for producing a sol-gel ink as claimed in claim 1, wherein the inorganic irregularly shaped particles comprise secondary particles formed from aggregated primary particles.

3. The method for producing a sol-gel ink as claimed in claim 2, wherein the primary particles have a mean particle size between 10 and 80 nm.

4. The method for producing a sol-gel ink as claimed in claim 2, wherein the secondary particles have a mean particle size along a direction of greatest dimension of more than 100 nm on average.

5. The method for producing a sol-gel ink as claimed in claim 1, further comprising a molar ratio of $R_nSiX_{(4-n)}$ to $SiX_4$ of between 2 and 6.

6. The method for producing a sol-gel ink as claimed in claim 1, wherein the first hydrolyzable silane is a quaternary silane $RSiX_3$.

7. The method for producing a sol-gel ink as claimed in claim 1, wherein the inorganic irregularly shaped particles comprise aluminum oxide particles.

8. The method for producing a sol-gel ink as claimed in claim 1, further comprising adding an acidic catalyst.

9. The method of claim 8, further comprising adjusting the sol-gel precursor to a pH of less than 4.

10. The method for producing a sol-gel ink as claimed in claim 1, wherein the ROR value is below 0.4.

11. A sol-gel ink, obtained by the method of claim 1.

12. The sol-gel ink as claimed in claim 11, wherein the sol-gel ink comprises at least one feature selected from the group consisting of: a total degree of condensation of sol-gel binder between 70 and 95; a ratio of tertiary to quaternary silane from 2:1 to 6:1; a methyl- or phenyl-functionalized sol-gel binder with inorganic filler particles; a solvent having a boiling point above 120° C. and an volatility of greater than 10; and inorganic platelet-shaped or non-platelet-shaped pigments and graphite.

13. The sol-gel ink as claimed in claim 11, wherein, in its dried state, the ink contains dried agglomerates of the inorganic irregularly shaped particles, which agglomerates have a fractal dimension between 1.5 and 2.0.

14. The sol-gel ink as claimed in claim 11, wherein the ink includes less than 5% of polysiloxane resin.

15. The sol-gel ink as claimed in claim 11, further comprising a crosslinked sol-gel binder that has a degree of condensation of less than 90%, a viscosity from 10 to 100 mPa·s, and that includes inorganic particles.

16. The sol-gel ink as claimed in claim 15, wherein, when stored at room temperature, a viscosity from 10 to 5000 mPa·s is preserved for 10 weeks.

17. The sol-gel ink as claimed in claim 11, wherein the ink has a use selected from the group consisting of: printing on an object in a screen printing process, a coating on a bottom surface of a glass ceramic plate; and a coating on a bottom surface of a glass ceramic plate of a cooktop.

* * * * *